Nov. 3, 1942.　　　　D. A. MERSON　　　　2,300,628
APPARATUS FOR TREATING THE SURFACES OF STORAGE BATTERY PLATES
Filed Oct. 19, 1940
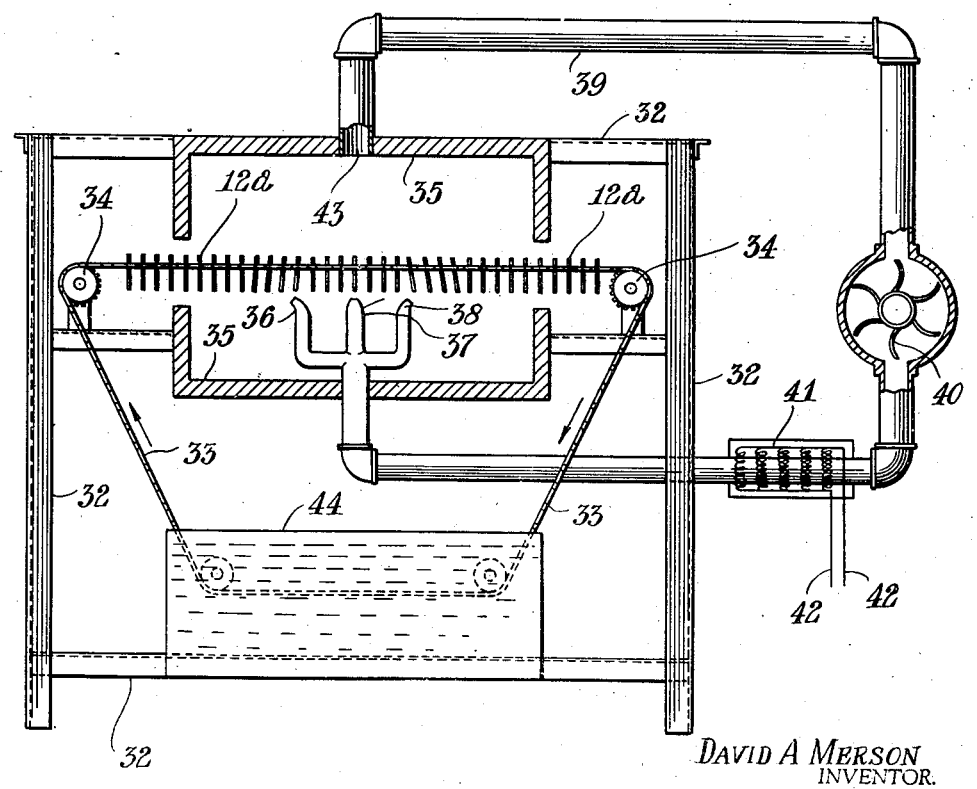
DAVID A MERSON
INVENTOR.
BY Charles F. Kaegebehn, and
John B. Henrich, Jr.
ATTORNEYS Patented Nov. 3, 1942

2,300,628

UNITED STATES PATENT OFFICE 2,300,628

APPARATUS FOR TREATING THE SURFACES OF STORAGE BATTERY PLATES

David A. Merson, Brooklyn, N. Y., assignor to National Lead Company, New York, N. Y., a corporation of New Jersey Application October 19, 1940, Serial No. 361,913

3 Claims. (Cl. 34—150)

The present invention relates to apparatus for treating the surfaces of newly pasted storage battery plates. More particularly, it relates to apparatus for the treatment of positive and negative plates of lead-acid type batteries in such a way as to modify the surfaces so that the plates may be either suspended closely together by their lugs, or stacked one on top of the other, without sticking together.

In the past, the surfaces of freshly pasted plates have been treated before drying and aging their interiors by one or several chemical agents. The earlier method involved dipping the plate after pasting in a dilute solution of sulfuric acid, thereby producing a surface bond of lead sulfate on each side of the plate. The plates could then be dried in an oven without the production of checks or cracks.

I am aware that later methods have involved the production of a lead carbonate film over the surface of the freshly pasted plates, the function of which was substantially the same as that of the lead sulfate film. The agents used in the production of the lead carbonate film have been solutions of alkali carbonates, specifically ammonium carbonate, or carbon dioxide gas, resulting from the combustion of natural or artificial illuminating gas. Such methods necessarily produced a film on the surface of the plates of a substance chemically different from the main body of the plate which led to many surface forming difficulties.

Among the objects of the present invention, therefore, is the providing of apparatus for drying the surfaces of storage battery plates without substantially altering the chemical composition of such surfaces and to make it possible subsequently to complete the drying of the plates in such a manner as to produce plates free from checks and cracks, easy to form and sufficiently hard to withstand the mechanical wear and tear encountered in the production of modern storage batteries.

Another object is to enable freshly pasted plates to be stacked or racked closely together, in a contacting manner if desired, without the plates sticking together, thus effecting the saving of considerable time, expense and space in handling the plates prior to the aging process to which the plates are later subjected. Other objects of the invention will become apparent from the detailed description thereof hereinafter to follow and from the accompanying drawing, in which the figure is an elevational side view of a drying apparatus constructed according to my invention.

With reference to the drawing, the figure represents my improved plate drying apparatus, which as shown, is supported by the framework 32. In this illustration of my invention the plates 12a, which have already been manually or mechanically pasted are suspended by their lugs upon an endless chain conveyor 33 driven by toothed wheels 34 which are, in turn, motor driven. The pasted plates are carried by the chain conveyor through a surface drying tunnel 35. The lower portion of the drying tunnel is provided with three flattened elongated air impingers 36, 37, and 38. These impingers are connected with an air channel or duct 39 which is provided with a motor driven fan 40 to blow the air through the impingers. Heating coils 41 supplied with electricity by means of the connections 42 surround the air duct at a point between the fan and the impingers, thereby to heat the air before it is forced through the impingers against the surfaces of the pasted plates. The air impingers are so arranged that the heated air emanating therefrom will uniformly dry both the front and back surfaces of the plates. Thus, impinger 36 is shaped and located so as to direct its column of heated air against the front surfaces of the plates as they are conveyed through the tunnel, whereas impinger 38 is designed to blow heated air against the rear surfaces of the plates. Impinger 37, besides acting to dry the plates, is arranged so as also to dampen the motion imparted to the plates by the air from impinger 36 and thus dispose the plates for the effective drying of their rear surfaces by the heated air from impinger 38. The heated air emanating from the impingers is sucked through the exhaust port 43 and recirculated through the air duct by means of the fan. The conveyor chain may be cooled by being immersed in a tank of water 44. After passing through the drying tunnel, the plates are manually or mechanically removed from the conveyor chain and subsequently processed.

It is to be noted that by the practice of my invention it is thus possible to dry the surfaces of the plates without the formation thereon of any substances foreign to the composition of the pasted plates themselves. The plates may then be racked or stacked in a contacting manner, thereby effecting a considerable saving of time and space in the handling, storing, and subsequent processing of the plates. Further it is to be understood that the present invention is applicable to the treatment of positive and negative plates prepared by any of the procedures known to the prior art but it is especially useful in the treatment of plates which have been produced with a paste prepared from litharge which contains a certain portion of finely divided metallic lead and which are subsequently interiorly dried or aged by reason of the exothermic heat resulting from the oxidation of the metallic lead, as more particularly described in my copending application, Serial No. 361,912, filed October 19, 1940, U. S. Patent No. 2,300,627, dated November 3, 1942.

The foregoing description and drawing of my invention have been given merely for illustrative purposes, and no undue limitations should be deduced therefrom. It is, therefore, to be understood that variations within the skill of the art are to be embraced within the scope of my invention.

I claim:

1. A drying apparatus adapted for uniformly drying the surfaces of storage battery plates comprising an endless conveyor adapted to support the plates by their lugs in a vertical position in such manner that the surfaces of the plates are exposed, a heating tunnel comprised of an upper and lower portion, the lower portion being provided with a plurality of air impingers connected with an air duct adapted to deliver heated air to said impingers, at least one of the air impingers being directed forwardly and at least one other of the air impingers being directed rearwardly so as to direct the heated air against the front and rear surfaces of the plates as they are conveyed through the heating tunnel, the upper portion of said heating tunnel being provided with an outlet port for withdrawing the heated air.

2. A drying apparatus adapted for uniformly drying the surfaces of storage battery plates comprising an endless conveyor adapted to support the plates by their lugs in a vertical position in such manner that the surfaces of the plates are exposed, a heating tunnel comprised of an upper and lower portion, the lower portion being provided with a plurality of air impingers connected with an air duct adapted to deliver heated air to said impingers, at least one of the air impingers being directed forwardly and at least one other of the air impingers being directed rearwardly so as to direct the heated air against the front and rear surfaces of the plates as they are conveyed through the heating tunnel, the upper portion of said heating tunnel being provided with an outlet port connected with the air duct whereby the heated air is withdrawn and recirculated through said air duct.

3. A drying apparatus adapted for drying the surfaces of storage battery plates comprising an endless conveyor adapted to support the plates by their lugs in a vertical position in such manner that the surfaces of the plates are exposed, a heating tunnel comprised of an upper and lower portion, one of said portions being provided with a plurality of air impingers connected with an air duct adapted to deliver heated air to said impingers, at least one of the air impingers being directed forwardly and at least one other of the air impingers being directed rearwardly so as to direct the heated air against the front and rear surfaces of the plates as they are conveyed through the heating tunnel and the other of said portions of the heating tunnel being provided with an outlet port for withdrawing the heated air.

DAVID A. MERSON.